(12) United States Patent
Luu

(10) Patent No.: US 6,641,049 B2
(45) Date of Patent: Nov. 4, 2003

(54) INTEGRATED CIRCUIT CARD WITH MULTIPLE INTEGRAL ELECTRONIC MODULES

(75) Inventor: Lu Vinh Luu, Plano, TX (US)

(73) Assignee: Pacusma Company, Ltd., Kowloon (HK)

( * ) Notice: Subject to any disclaimer, the term of this patent is extended or adjusted under 35 U.S.C. 154(b) by 0 days.

(21) Appl. No.: 09/934,842

(22) Filed: Aug. 23, 2001

(65) Prior Publication Data

US 2002/0023963 A1 Feb. 28, 2002

Related U.S. Application Data

(60) Provisional application No. 60/229,033, filed on Aug. 31, 2000.

(51) Int. Cl.[7] .............................................. G06K 19/06
(52) U.S. Cl. ....................................... 235/492; 235/441
(58) Field of Search ................................ 235/492, 380, 235/487, 486, 488, 441; 361/686, 736, 737; 455/90, 550, 556, 551, 575, 558; 340/543, 815; 379/144, 357

(56) References Cited

U.S. PATENT DOCUMENTS

| | | | | |
|---|---|---|---|---|
| 4,841,134 A | * | 6/1989 | Hida et al. .................... 235/488 |
| 5,581,065 A | * | 12/1996 | Nishikawa et al. ......... 235/492 |
| 5,821,614 A | * | 10/1998 | Hashimoto et al. ......... 235/492 |
| 5,870,289 A | * | 2/1999 | Tokuda et al. ............... 174/260 |
| 5,872,353 A | * | 2/1999 | Reichardt et al. ........... 235/441 |
| 5,915,226 A | * | 6/1999 | Martineau .................... 455/558 |
| 5,979,771 A | * | 11/1999 | Adams et al. ............... 235/441 |
| 6,009,315 A | * | 12/1999 | De Larminat et al. ........ 455/90 |
| 6,076,737 A | * | 6/2000 | Gogami et al. .............. 235/492 |
| 6,240,301 B1 | * | 5/2001 | Phillips ....................... 455/550 |
| 6,320,751 B2 | * | 11/2001 | Takeda et al. ............... 361/737 |
| 6,431,456 B2 | * | 8/2002 | Nishizawa et al. ......... 235/492 |
| 6,454,164 B1 | * | 9/2002 | Wakabayashi et al. ...... 235/380 |

\* cited by examiner

Primary Examiner—Michael G. Lee
Assistant Examiner—Edwyn Labaze
(74) Attorney, Agent, or Firm—Dickstein Shapiro Morin & Oshinsky, LLP

(57) ABSTRACT

The smart card according to the present invention includes a first integrated electronic module on one surface and another integrated electronic module on the opposite surface of the card, whereby the card is merely flipped over and reinserted into the electronic device to change applications or functions. The two integrated electronic modules provided on opposing surfaces of the card may be formed as two separate chips each embedded on one side of the card, or as one chip having exposed contact terminals on both faces of the card, depending on the size of the chip(s) mounted in the card. Alternatively, two integrated electronic modules can be both provided on the same surface of the card, in which case the card is rotated 180° to place the desired integrated electronic module in contact with the contact interface in the device to access the desired application or function. In a further embodiment, the card is provided with four integrated electronic modules, so that four different functions or applications can be realized using the same electronic device by simply arranging the card in the electronic device so that the appropriate integrated electronic module is aligned with the contact interface in the device. When the card includes a plug-in sized SIM card, two or more corners of the card are notched, with each notch corresponding to the orientation of a respective integrated electronic module when correctly positioned in the activated position in an electronic device.

12 Claims, 3 Drawing Sheets

INTEGRATED CIRCUIT CARD WITH MULTIPLE INTEGRAL ELECTRONIC MODULES

This application claims the benefit of U.S. Provisional Application No. 60/229,033, filed Aug. 31, 2000, the disclosure of which is herein incorporated by reference.

BACKGROUND OF THE INVENTION

1. Field of the Invention

The present invention relates to an electronic information storage or memory card for use in portable electronic and communication devices, appliances, and for providing access to goods, services, and information.

2. Brief Description of the Related Art

Interchangeable information or memory cards are currently known and used in conjunction with many types of electronic devices, especially communication devices, for storing data, enabling secure access to a particular network or account, or configuring such devices to perform different functions. Such cards are typically made of plastic and have an electronic chip module mounted or embedded therein. The module is a semiconductor chip including an integrated circuit with memory, if appropriate, and contact or connection points for electrically connecting the terminals of the integrated circuit to the contact interface in the electronic device in which the card is inserted. Portable information or memory cards must be provided with standardized dimensions with the chip oriented in a predetermined position relative to the edges of the card, depending on the type of electronic device.

As one example of this type of information card, many mobile telephones use cards having subscriber identity modules (SIM cards) to enable a user to access the wireless telephone network in a particular country. Each SIM module contains the configuration information for a specific network, and also contains information identifying the user, such as the user's mobile telephone number. It is often the case that the mobile telephone networks used from country to country or territory to territory are incompatible with each other, even though they may share the same borders. In places where travel between countries or territories is common, such as between countries in Europe or between China and Hong Kong, the user is thus required to carry two or more such SIM cards and to remove one card from the mobile phone to be replaced with another whenever the user crosses a border.

Other types of electronic cards currently known in the art include MultiMedia cards (MMCs), secure digital (SD) memory cards, SmartMedia™ cards, and Sony Memory Stick™.

MMCs are a relatively new data storage medium having a compact size and high storage capacity, and are commonly provided to be connectable to a handheld communication device. MMCs are similar to flash memory and ROM, but are removable and exchangeable, thus providing greater flexibility and capabilities to portable smart phones, cellular telephones, and pagers, etc. Currently, storage capacities are available for 2, 4, 8, and 16 MB, with a 32 MB capacity soon to be available. Within the next several years, MMCs will be capable of storing up to 128 MB and will be supported by many microcontrollers on the market, including devices in which up to 30 MMCs can be connected to a single bus.

An SD memory card is a highly-sophisticated device about the size of a postage stamp. SD memory cards are used to digitally store any type of multimedia data, and therefore have potential applications not only in communication fields, but also entertainment and information storage. For example, SD memory cards are usable in conjunction with palmtop computers, personal computers, digital cameras, audio/voice recorders, printers, and game consoles. Like SIM cards and MMCs, SD memory cards are non-volatile, which means that they do not require power to retain the information stored therein. They are solid state devices, so they have no moving parts to skip or break down. Also, SD memory cards provide a storage capacity of 32 and 64 MB, with 128 and 256 MB capacity likely to be available in the near future.

SD memory cards enable high-speed, user-friendly, and secure downloading of digital files for a number of multimedia applications including music, movies, photos, and pervasive computing applications such as, for example, downloading cooking instructions from a suitably equipped microwave oven. Files can be easily transferred from a PC to the SD memory card, or vice versa, whereupon the SD card containing the transferred information can then be used in another electronic device.

As with the SIM cards, if a user desires to perform more than one function or capability with the device or requires more storage than available on one of the MMC or SD memory card, it will be necessary for the user to carry and switch between two or more cards, which is, of course, inconvenient.

SUMMARY OF THE INVENTION

The present invention overcomes the disadvantage encountered in the prior art discussed above by providing an integrated circuit card having at least two integrated electronic modules for enabling a corresponding number of applications on one card, thus eliminating the need to carry an additional card for each additional function or application. In particular, the integrated electronic card according to the present invention includes at least two integrated electronic modules which can be individually accessed based upon the orientation of the card in the electronic device. To activate a different integrated electronic module, the card is simply removed from the electronic device, re-oriented (rotated or flipped over) and reinserted into the device. The need for carrying a different card for each integrated electronic module is thus eliminated.

In a first embodiment of the invention, the two integrated electronic modules are provided on opposing surfaces of the card and may be formed as two separate semiconductor chips each embedded on one side of the card, or as one chip having exposed contact terminals on both faces of the card, depending on the size and shape of the chip(s) mounted in the card. In the embodiment, the card is flipped over to place the desired integrated electronic module in contact with the contacts of the electronic device.

In a second embodiment of the present invention, the two integrated electronic modules are both provided on the same surface of the card, and the card is rotated to place the desired integrated electronic module in contact with the contact interface in the device to access the desired application or function. In a further embodiment, the card is provided with four integrated electronic modules, so that four different functions or applications can be realized using the same electronic device by simply arranging the card in the electronic device so that the appropriate integrated electronic module is aligned with the contact interface in the device.

In a conventional SIM or smart card, one of the corners of the card is notched so as to guide the user as to the correct orientation of the card upon insertion into the electronic device. In the present invention, two or more corners of the card are notched, with each notch corresponding to the orientation of a respective integrated electronic module when correctly positioned in the activated position in the electronic device.

Other features and advantages of the present invention will become apparent from the following description of the invention which refers to the accompanying drawings.

DETAILED DESCRIPTION OF EMBODIMENTS OF THE INVENTION

The information storage card of the present invention may be a modification of a SIM card, either the full-ISO size or the plug-in/micro size; a MultiMedia card (MMC); a secure digital (SD) memory card; or any other type of flash, non-volatile, solid state memory card or integrated electronic module card. The card of the present invention may be used in mobile or cellular telephones, portable or handheld computers, or any other type of electronic device or appliance compatible with portable memory or expandable/interchangeable capability card technology.

Such integrated electronic cards are typically made of plastic and have an electronic chip module mounted or embedded therein. The module is a semiconductor chip including an integrated circuit with memory, if appropriate, and contact or connection terminals for electrically connecting the terminals of the integrated circuit to the contact interface in the electronic device into which the card is inserted. The card body can be formed by injection molding or milling, and then the integrated electronic module is provided as a film by being rolled onto the card. Portable integrated electronic cards are typically provided with standardized dimensions with the chip positioned in a predetermined location relative to the edges of the card, depending on the type of electronic device.

SIM cards may be provided in a full-ISO size or a micro/plug-in size. The plug-in size is approximately 25 mm long and 15 mm wide, and less than 1 mm thick. To ensure correct orientation of the SIM card upon insertion in the mobile phone, one corner of the otherwise rectangular card is cut at an angle, so that the length of one edge of the card is reduced to about 21 mm while the width of the adjacent edge is reduced to about 12 mm. The card can only be inserted in the phone with an angled corner in the correct orientation.

Figure 1A:
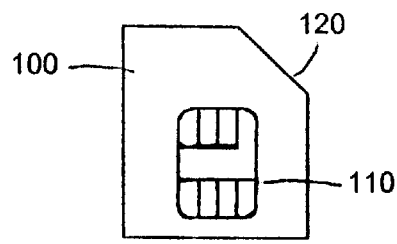
FIGS. 1A and 1B show the front and back views of a prior art plug-in card having only one integrated electronic module on one surface of the card.
Figure 1B:
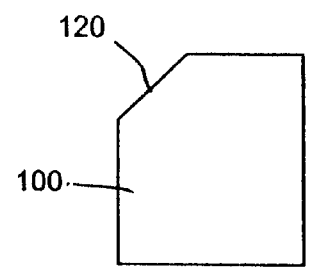

FIGS. 1A and 1B illustrate the two surfaces of an example of a plug-in sized SIM card known in the art, having a card body 100, an integrated electronic module 110 mounted therein on one surface thereof, and an angled corner 120 for guiding the user as to the correct orientation of the card upon insertion into the electronic device. As can be seen in FIG. 1B, if the card body 100 is flipped over, there is no integrated electronic chip or connection terminals which can be electronically connected to the electronic interface of the electronic device.

The SIM card produced in accordance with the present invention may be provided as either a full-size ISO card or as a plug-in sized card. The full-sized card has the shape of the plug-in sized card die cut therein, so that the smaller card size can be easily detached from the larger card body to be used as a plug-in sized card.

Figure 2A:
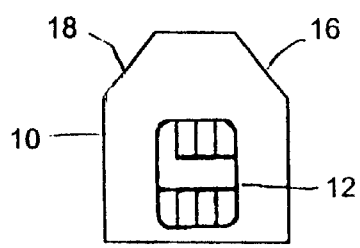
FIGS. 2A and 2B show the front and back surfaces, respectively, of a plug-in card having two integrated electronic modules in accordance with the present invention.
Figure 2B:
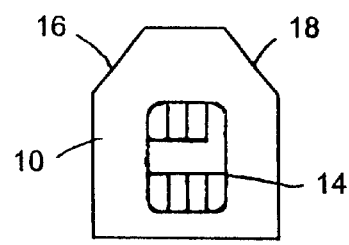

FIGS. 2A and 2B show the front and back surfaces of a plug-in sized SIM card 10 having two integrated electronic modules 12, 14 in accordance with the present invention. To enable each integrated electronic module to be correctly aligned for activation of the selected module in the electronic device, corners 16, 18 are cut at an angle, with corner 16 corresponding to integrated electronic module 12 on the front side, and corner 18 corresponding to integrated electronic module 14 on the back side of card 10. To switch between the two integrated electronic modules in the electronic device, the card 10 is simply removed from the device, flipped around the width dimension (longitudinal axis), and reinserted into the electronic device.

Figure 3A:
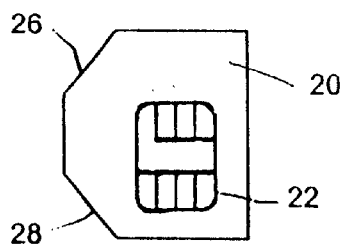
FIGS. 3A and 3B show the front and back surfaces, respectively, of a variation of the plug-in card shown in FIGS. 2A and 2B.
Figure 3B:
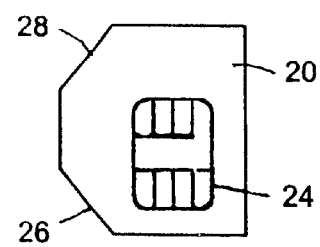

FIGS. 3A and 3B show the front and back surfaces of another plug-in sized SIM card 20 having two integrated electronic modules 22, 24 in accordance with the present invention. To enable each integrated electronic module to be correctly aligned for activation of the selected one in the electronic device, corners 26, 28 are cut at an angle, with corner 26 corresponding to integrated electronic module 22 on the front side, and corner 28 corresponding to integrated electronic module 24 on the back side of card 20. To switch between the two integrated electronic modules in the electronic device, the card 20 is simply removed from the device, flipped around the length dimension (minor axis), and reinserted into the electronic device.

Figure 4A:
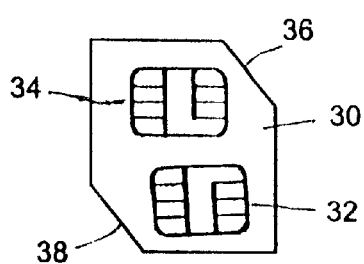
FIGS. 4A and 4B show a first orientation and a second orientation of a plug-in card having two integrated electronic modules on the same surface in accordance with the present invention.
Figure 4B:
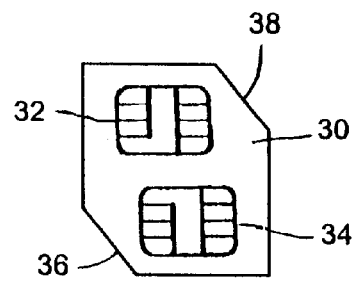

FIGS. 4A and 4B show a first orientation and a second orientation of still another plug-in sized SIM card 30 in accordance with the present invention. SIM card 30 includes two integrated electronic modules 32, 34 both on the same surface of card 30. To enable each integrated electronic module to be correctly aligned for activation of the selected one in the electronic device, corners 36, 38 are cut at an angle, with corner 36 corresponding to integrated electronic module 32, and corner 38 corresponding to integrated electronic module 34. To switch between the two integrated electronic modules in the electronic device, the card 30 is simply removed from the device, rotated 180° and reinserted into the electronic device.

The integrated electronic module chips can have any size or shape as long as the contact or connection points of the integrated electronic module are positioned to contact the connection terminals in the electronic device when the card is inserted therein with the desired integrated electronic module oriented in the active position. Hence, when the two integrated electronic modules are provided on opposing surfaces of the card, the integrated electronic modules may be formed as two separate chips each embedded on one side of the card, or as one chip having exposed contact terminals on both faces of the card. Similarly, when the two integrated electronic modules are both placed on the same surface of the card, the integrated electronic modules may be formed as two separate chips at each end of the one surface or a centrally located chip having contact terminals disposed at the appropriate locations at the two ends of the card on the same surface thereof.

Figure 5A:
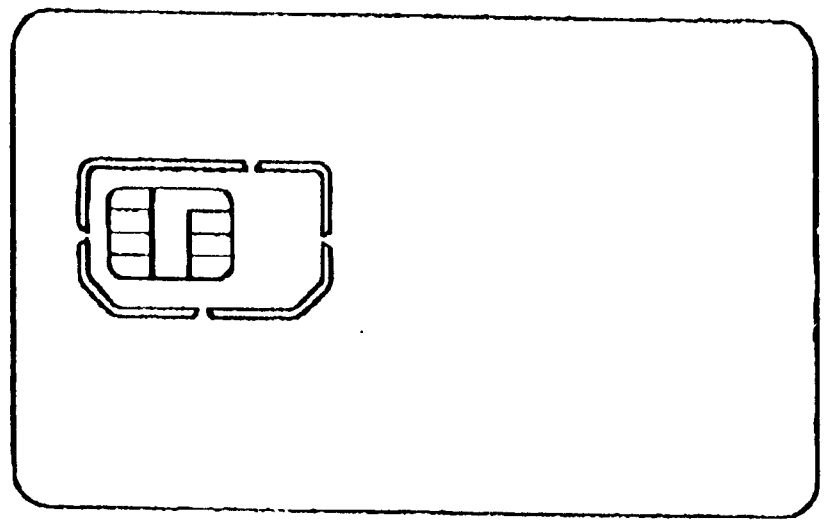
FIGS. 5A and 5B show a front and back surface view of a full ISO sized integrated electronic card having the shape of a plug-in sized card die cut therein, with the integrated electronic modules mounted inside the die-cut plug-in card region.
Figure 5B:
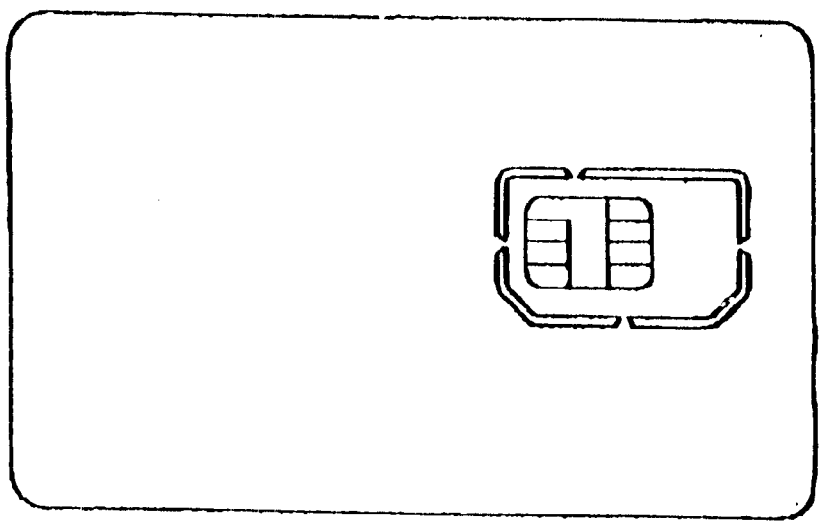

As shown in FIGS. 5A and 5B, the present invention may be embodied as a full-ISO sized card serving as a carrier for the plug-in sized SIM card, or in which the shape of the plug-in sized SIM card is die cut into the full-sized card. Formed in this manner, the plug-in sized card can be easily punched out and removed from the full-sized card if desired. Any of the aforementioned configurations of the plug-in sized card in accordance with the present invention can be provided in the full-ISO sized card.

An MMC is similar to a SIM card except that MMCs are thicker and larger than SIM cards. An MMC is generally rectangular, and measures about 32 mm in length and about 24 mm in width.

Another type of smart memory card is a secure digital memory card (SD memory card). An example of an SD memory card is a solid state floppy disk card known commercially as the SmartMedia™ card. This card measures 45 mm by 37 mm and is also thicker than a SIM card, approximately 0.76 mm thick. An SD memory card can be provided in either a 5 V or 3.3 V option. In the 5 V embodiment, the card is notched on the upper left corner, while the 3.3 V embodiment is notched on the upper right corner. In accordance with the present invention, therefore, in which two corners are notched to enable dual-sided functionality of the card, the card must be labeled to indicate the correct capacity and capabilities of the card.

Figure 6A:
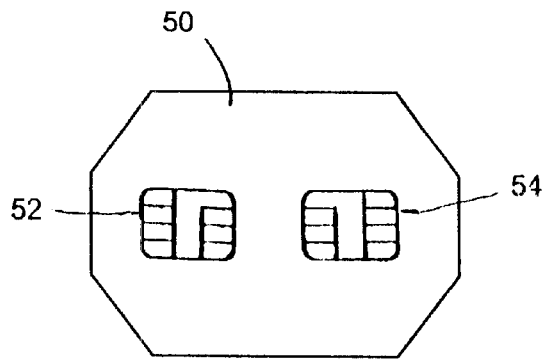
FIGS. 6A and 6B show the front and side views, respectively, of a MultiMedia Card having four integrated electronic modules in accordance with another embodiment of the present invention.
Figure 6B:
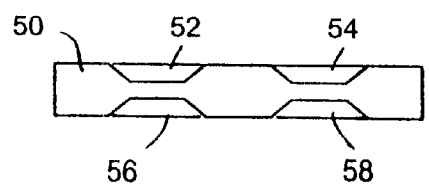

Because SIM cards are very thin, the SIM card produced in accordance with the present invention would only have two integrated electronic modules provided on opposite surfaces of the card or on opposites sides of the same surface. On the other hand, since the MMC and SD card are thicker than the SIM card, both the MMC and the SD memory card can accommodate the four integrated electronic module embodiments as shown in FIGS. 6A and 6B, where two modules 52, 56 and 54, 58 can be placed back-to-back on opposite sides of the card 50. With this embodiment, a user can easily change between four different functions, capabilities or access four different networks or secure systems by simply changing the orientation of the card in the device.

The present invention offers distinct advantages over the prior art by providing a plurality of integrated electronic modules on a single card. Each integrated electronic module is individually readable or activated by the electronic device when the card is oriented and inserted into the electronic device with the selected module contacting the IC interface in the electronic device. The remaining modules are not connected to the electronic device and are safely stored inside the device without any inconvenience or risk of loss or misplacement, and thereby eliminating the need to carry or store a plurality of different integrated electronic cards.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An integrated circuit card for being inserted into an electronic device, comprising:
    a generally rectangular card having at least two corners each cut at an angle such that the perimeter of said generally rectangular card comprises at least six straight edges and no more than two generally right angled corners; and
    at least two integrated electronic modules mounted in said generally rectangular card, said modules enabling at least a corresponding number of electronic device applications, wherein each corner of the card cut at an angle is associated with a respective one of the integrated electronic modules and is always positioned according to a predetermined relationship with respect to the location of the corresponding integrated electronic module, such that activation of each integrated electronic module can only be achieved by placing the card into an electronic device with the corresponding angled corner in a predetermined orientation to electronically connect the respective integrated electronic module with the electronic device.

2. The integrated circuit card according to claim 1, wherein at least one integrated electronic module is mounted in one surface of the card and at least one integrated electronic module is mounted in an opposite surface of the card.

3. The integrated circuit card according to claim 2, wherein the number of integrated electronic modules mounted in the card is two, and wherein the at least two cut corners are adjacent along the perimeter of the card.

4. The integrated circuit card according to claim 1, wherein two integrated electronic modules are mounted in the card at opposite ends and on opposite surfaces of the card.

5. The integrated circuit card according to claim 1, wherein the number of integrated electronic modules mounted in the card is two, and wherein the two integrated electronic modules are mounted in the same surface of the card.

6. The integrated circuit card according to claim 1, comprising four integrated electronic modules mounted in the card, wherein the integrated electronic modules are arranged such that each of two pairs of modules is positioned in a back-to-back relationship.

7. The integrated circuit card according to claim 1, wherein two integrated electronic modules are provided as one semiconductor chip, said semiconductor chip having contact terminals on both surfaces of the card.

8. The integrated circuit card according to claim 1, wherein the integrated circuit card is selected from the group consisting of a SIM card, a MultiMedia card, a secure digital memory card, a flash memory card, and a solid-state memory card.

9. The integrated circuit card according to claim 8, wherein the integrated circuit card is a subscriber identity module card.

10. The integrated circuit card according to claim 9, wherein the integrated circuit card is a plug-in sized subscriber identity module card.

11. The integrated circuit card according to claim 10, wherein the integrated circuit card has dimensions as defined by the International Standards Organisation for integrated circuit cards.

12. The integrated circuit card according to claim 9, wherein the integrated circuit card has dimensions as defined by the International Standards Organisation for integrated circuit cards.

* * * * *